United States Patent
Breese et al.

(10) Patent No.: US 6,234,911 B1
(45) Date of Patent: May 22, 2001

(54) DRIVESHAFT ASSEMBLY HAVING A NOISE REDUCTION STRUCTURE

(75) Inventors: Douglas E. Breese, Northwood; Kellie L. Stevens, Holland; Christopher C. Cheney, Bowling Green, all of OH (US)

(73) Assignee: Spicer Driveshaft, Inc., Holland, OH (US)

( * ) Notice: Subject to any disclaimer, the term of this patent is extended or adjusted under 35 U.S.C. 154(b) by 0 days.

(21) Appl. No.: 08/928,158

(22) Filed: Sep. 12, 1997

Related U.S. Application Data (63) Continuation-in-part of application No. 08/714,468, filed on Sep. 16, 1996, now abandoned.

(51) Int. Cl.$^7$ .................................................. F16C 3/00
(52) U.S. Cl. ........................................... 464/183; 464/903
(58) Field of Search .................................. 464/179, 180, 464/183, 903; 267/141; 188/379

(56) References Cited

U.S. PATENT DOCUMENTS

| | | |
|---|---|---|
| 2,001,166 | 5/1935 | Swennes . |
| 2,023,131 | 12/1935 | Gibson . |
| 2,133,091 * | 10/1938 | Gettig .................................... 464/183 |
| 2,889,695 | 6/1959 | Moeller . |
| 3,052,107 | 9/1962 | Kempf . |
| 3,075,406 | 1/1963 | Butler, Jr. et al. . |
| 3,286,487 | 11/1966 | Esperson . |
| 3,479,030 | 11/1969 | Merola . |
| 3,659,434 | 5/1972 | Wolfe . |

(List continued on next page.)

FOREIGN PATENT DOCUMENTS

| | | |
|---|---|---|
| 404153 | 1/1934 | (GB) . |

OTHER PUBLICATIONS

Dana Drawing No. 2–3–12811X dated Nov. 1994.

Primary Examiner—Lynne H. Browne
Assistant Examiner—Greg Binda
(74) Attorney, Agent, or Firm—MacMillan, Sobanski & Todd, LLC (57) ABSTRACT

A noise reduction structure for an aluminum-based driveshaft tube includes a generally cylindrical member having a predetermined length. The noise reduction structure is disposed within a driveshaft tube in a press fit relationship with the inner surface of the tube. In general, the noise reduction structure is positioned within the driveshaft tube at a location where the amplitude of a standing wave caused by the reflection of the sound waves back and forth along the driveshaft tube is at its maximum value. The length of the noise reduction structure may be about 10% or less of the value of the length of the driveshaft tube. In a first embodiment, the noise reduction structure is formed from a polymeric foam material having a density of less than about 10 lb/ft$^3$. Preferably, the material has a density in the range of about 2 lb/ft$^3$ to 10 lb/ft$^3$, and more preferably, in the range of about 3 lb/ft$^3$ to 7 lb/ft$^3$. One type of material which is particularly well suited for this invention is a polymeric cushioning foam having a density of about 5 lb/ft$^3$. In a second embodiment, the noise reduction structure is formed from a plurality of relative long cylindrical members that are press fit within the driveshaft tube and are located equidistantly from one another. Each of these cylindrical members is preferably formed from a polyether material having density of at least 1.4 lb/ft$^3$, and most desirably are formed having a density of 1.5 lb/ft$^3$. In a third embodiment, the noise reduction structure is formed from a single elongated cylindrical member that is press fit within the driveshaft tube and is preferably formed from a polyether material having density of at least 1.4 lb/ft$^3$, and more desirably is formed having a density of 1.5 lb/ft$^3$. One or both of the end portions of the driveshaft tube may be formed having a reduced diameter.

18 Claims, 6 Drawing Sheets

U.S. PATENT DOCUMENTS

| | | |
|---|---|---|
| 3,861,682 | 1/1975 | Fujii . |
| 4,043,147 | 8/1977 | Wiebe . |
| 4,722,717 | 2/1988 | Salzman et al. . |
| 4,844,193 | 7/1989 | Veselica et al. . |
| 4,944,279 * | 7/1990 | Woodard ............................ 464/57 X |
| 5,056,763 | 10/1991 | Hamada et al. . |
| 5,243,880 * | 9/1993 | Beier et al. ...................... 464/180 X |
| 5,268,009 * | 12/1993 | Thompson et al. ...................... 96/67 |
| 5,326,324 | 7/1994 | Hamada . |
| 5,331,737 | 7/1994 | Jarvela . |
| 5,593,144 * | 1/1997 | Hamada et al. ................. 464/180 X |
| 5,643,093 * | 7/1997 | Breese .................................. 464/183 |
| 5,904,622 * | 5/1999 | Breese et al. ........................ 464/180 |
| 5,976,021 * | 11/1999 | Stark et al. ..................... 464/183 X |

\* cited by examiner

DRIVESHAFT ASSEMBLY HAVING A NOISE REDUCTION STRUCTURE

CROSS REFERENCE TO RELATED APPLICATION

This application is a continuation-in-part of Ser. No. 08/714,468, filed Sep. 16, 1996 now abandoned.

BACKGROUND OF THE INVENTION

This invention relates in general to vehicle driveshafts, and in particular to a vehicle driveshaft tube having a noise reduction structure contained therein.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels. A typical vehicle driveshaft assembly includes a hollow cylindrical driveshaft tube having an end fitting secured to each end thereof. Usually, the end fittings are embodied as end yokes which are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels. Traditionally, driveshaft tubes were made from steel. More recently, aluminum driveshafts have been developed because of their lighter weight.

One problem encountered by all types of driveshaft assemblies is their tendency to produce and transmit sound while transferring the power of the engine to the axle assembly. It is known that any mechanical body has a natural resonant frequency. This natural resonant frequency is an inherent characteristic of the mechanical body and is based upon many factors, including its composition, size and shape. The natural resonant frequency is made up of many sub-frequencies, often referred to as harmonics. As the vehicle is operated through its normal speed range (i.e. from 0 mph to about 80 mph), the rotational velocity of the driveshaft assembly changes (i.e. from 0 rpm to about 5000 rpm). As the rotational velocity of the driveshaft changes, it passes through the harmonic frequencies of the body's resonant frequency. When the rotational velocity of the driveshaft passes through these harmonic frequencies, vibration and noise may be amplified since the two frequencies are synchronized and the rotational energy of the driveshaft is converted into vibration and noise. This noise can be undesirable to passengers riding in the vehicle. Thus, it would be advantageous to deaden or reduce the sound produced by a vehicle driveshaft assembly in order to provide the passengers with a more quiet and comfortable ride.

Various attempts have been made to deaden the sound produced by vehicle driveshaft tubes. One general direction that many of these attempts have followed is to place a noise absorbing/deadening structure within the driveshaft. For example, one attempt involves disposing a hollow cylindrical cardboard insert inside an aluminum driveshaft tube to deaden the sound. However, the cardboard insert required external rubber ribs to prevent it from sliding inside the aluminum driveshaft tube. As a result, the cardboard insert is relatively complicated and expensive to employ. Other attempts at deadening the sound involve completely or partially filling the driveshaft tube with relatively non-resonant material such as steel wool, cotton, and even plaster. The use of plugs of compressible and slightly resilient material such as cork or rubber has also been suggested.

As exemplified by the number of proposed solutions to the sound problem in driveshafts, the particular solution for a specific type of driveshaft is not always straightforward. For instance, there are questions concerning what types of materials are most effective and suitable for the type of driveshaft employed. In addition, there are questions concerning the added weight, cost and performance of the material chosen for the noise reduction structure. Thus, it would be desirable to provide a noise reduction structure for an aluminum-based driveshaft tube which is lightweight, inexpensive, and long-lasting. In addition, it would particularly be desirable to provide this lighter, less expensive noise reduction structure for an aluminum-based driveshaft tube which is as or more effective in reducing the sound levels of such a driveshaft tube than the known noise reduction structures and mechanisms.

SUMMARY OF THE INVENTION

The invention relates to a noise reduction structure for an aluminum-based driveshaft tube having improved sound deadening properties. The noise reduction structure in accordance with the present invention is a generally cylindrical member having a predetermined length L1. The noise reduction structure is disposed within a driveshaft tube in a press fit relationship with the inner surface of the tube. In general, the noise reduction structure is positioned within the driveshaft tube at a location where the amplitude of a standing wave caused by the reflection of the sound waves back and forth along the driveshaft tube is at its maximum value. The length L1 of the noise reduction structure may be about 10% or less of the value of the length L of the driveshaft tube. In a first embodiment of this invention, the noise reduction structure is formed from a polymeric foam material having a density of less than about 10 lb/ft$^3$. Preferably, the material has a density in the range of about 2 lb/ft$^3$ to 10 lb/ft$^3$, and more preferably, in the range of about 3 lb/ft$^3$ to 7 lb/ft$^3$. One type of material which is particularly well suited for this invention is a polymeric cushioning foam having a density of about 5 lb/ft$^3$. In a second embodiment of this invention, the noise reduction structure is formed from a plurality of relative long cylindrical members that are press fit within the driveshaft tube and are located equidistantly from one another. Each of these cylindrical members is preferably formed from a polyether material having density of at least 1.4 lb/ft$^3$, and most desirably are formed having a density of 1.5 lb/ft$^3$. In a third embodiment of this invention, the noise reduction structure is formed from a single elongated cylindrical member that is press fit within the driveshaft tube and is preferably formed from a polyether material having density of at least 1.4 lb/ft$^3$, and more desirably is formed having a density of 1.5 lb/ft$^3$.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
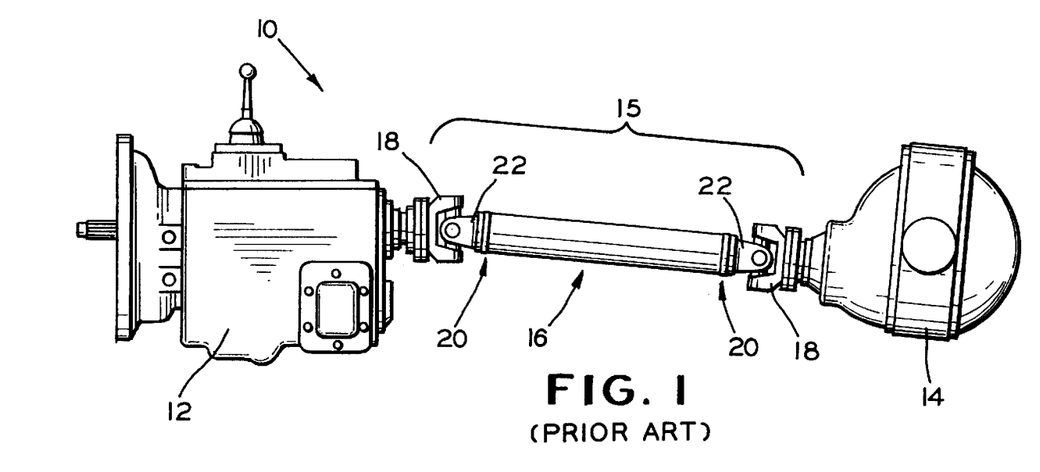
FIG. 1 is a schematic view in elevation of a prior art vehicle drive train including a drive line assembly.

Referring now to the drawings, there is illustrated in FIG. 1 a vehicle drive train, indicated generally at 10. The drive train includes a transmission 12 connected to axle assembly 14 through drive line assembly 15. The drive line assembly 15 includes a cylindrically-shaped driveshaft tube 16. As is typical in vehicle drive trains, the transmission output shaft, not shown, and the axle assembly input shaft, not shown, are not co-axially aligned. Therefore, universal joints 18 are positioned at each end 20 of the driveshaft tube 16 to rotatably connect the driveshaft tube to the transmission output and the axle assembly input shafts. The connection between the ends 20 of the driveshaft tube and the universal joints is usually accomplished by tube yokes 22.

Figure 2:
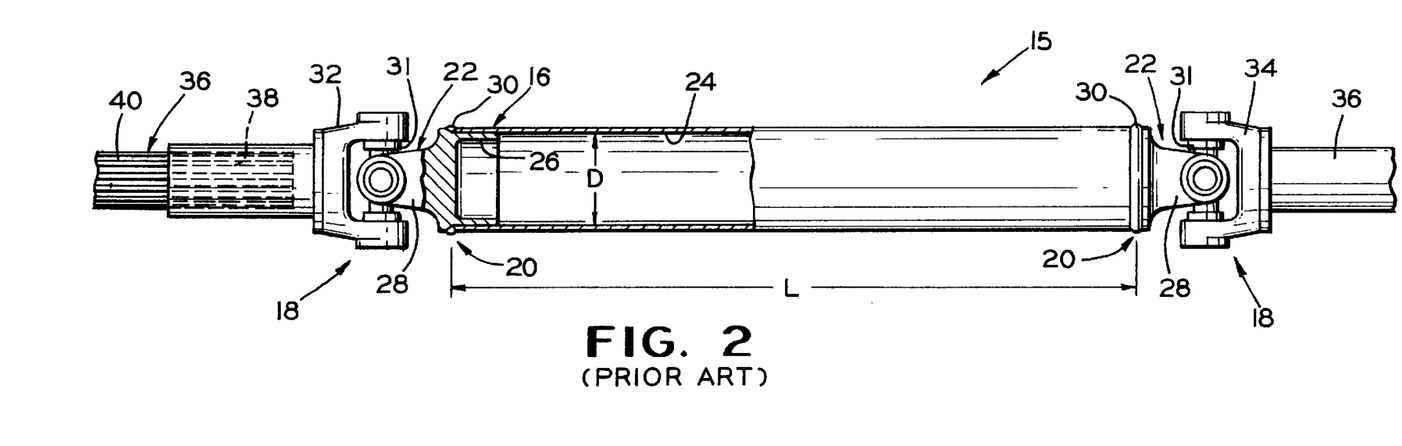
FIG. 2 is a side view, partially in cross section and partially in schematic views, of the prior art drive line assembly illustrated in FIG. 1.

FIG. 2 shows a side schematic view of a conventional drive line assembly 15. It can be seen that the driveshaft tube 16 is a hollow cylindrical tube having a relatively long, narrow shape. The driveshaft tube 16 has an axial length L defined by the distance between the two ends 20. The driveshaft tube 16 includes an inner cylindrical surface 24 which extends the length of the tube and which defines an internal diameter D.

The driveshaft tube 16 can be formed from a single piece of metal. Alternatively, multiple piece driveshaft tubes can be used. In addition, the driveshaft 16 can be formed having a larger diameter center portion, an end portion having a reduced diameter, and a diameter reducing portion positioned between the center and end portions. This type of driveshaft tube is more fully described in assignee's commonly owned U.S. Pat. No. 5,643,093, issued Jul. 1, 1997, the disclosure of which is incorporated herein by reference. The driveshaft tube 16 can be formed from any suitable material. Typically, the driveshaft tube 16 is formed from steel or an aluminum alloy. Preferably, the driveshaft tube 16 is formed from an aluminum alloy. Suitable methods for forming the driveshaft tube 16 are well known to persons skilled in the art.

The ends 20 of the driveshaft tube 16 are open and are adapted for receiving an end fitting 22. In the illustrated embodiment, a tube yoke 22 is disposed within each end 20. In general, each tube yoke 22 typically includes a tube seat 26 at one end and a lug structure 28 at the other end. The tube seat 26 is a generally cylindrical-shaped member which is adapted to be inserted into an open end of the driveshaft tube 16. Accordingly, the tube seat 26 enables torque to be transmitted between the driveshaft tube 16 and the tube yoke 22. Typically, the tube yoke 22 is secured to the driveshaft tube 16 by a weld. In the illustrated embodiment, a circle weld 30 is made around the circumference of the interface between the driveshaft tube 16 and the tube yoke 22.

The lug structure 28 of each tube yoke 22 is operatively connected to a cross 31 used in each universal joint 18. Each universal joint 18 also includes a second yoke 32 or 34 as shown in FIG. 2. Each yoke 32 and 34 is operatively connected to a connecting shaft 36 and 37, respectively. One of these connecting shafts 36 may connected to transmission 12, while the other connecting shaft 37 may be connected to the axle assembly 14. In the illustrated embodiment, yoke 32 is a slip yoke having internal splines 38 which cooperate with external splines 40 on the connecting shaft 36 to allow the yoke 32 and the connecting shaft 36 to be axially movable with respect to one another.

Figure 3:
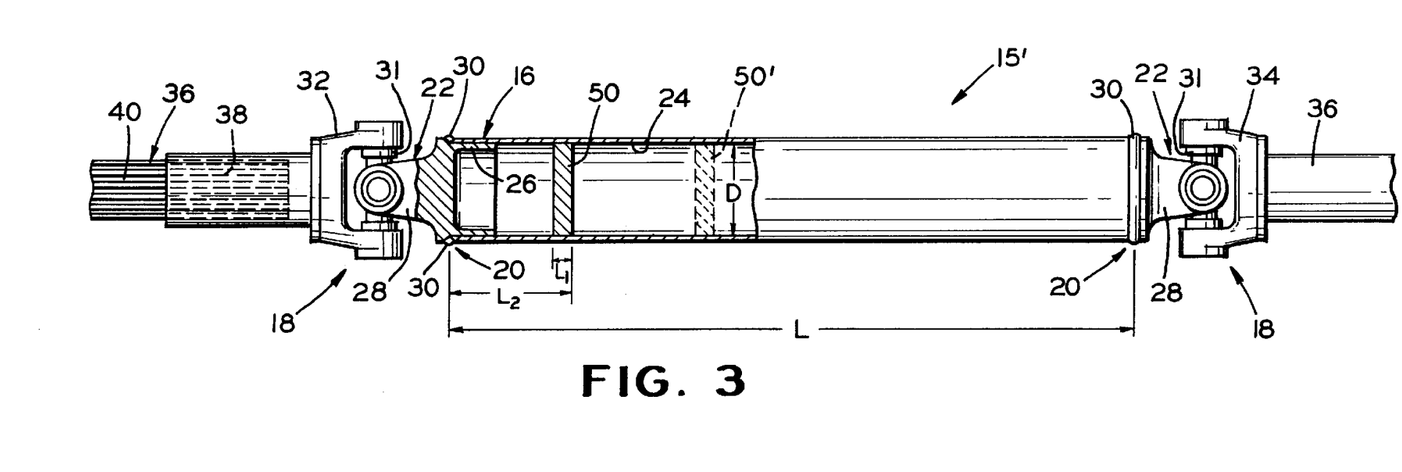
FIG. 3 is a side view, partially in cross section and partially in schematic views, of a drive line assembly having a noise reduction structure disposed within the driveshaft tube in accordance with this invention.

Referring now to FIG. 3, there is illustrated a drive line assembly 15' in accordance with this invention. In general, the drive line assembly 15' includes all of the components described above. Therefore, the description of these components and the numbers used to identify these components are applicable to the description of drive line assembly 15'. However, the drive line assembly 15' in accordance with this invention has improved sound deadening properties to reduce noise and vibration from the driveshaft tube during operation of the vehicle. The invention achieves this benefit by disposing a noise reduction structure 50 within the driveshaft tube 16.

Figure 4:
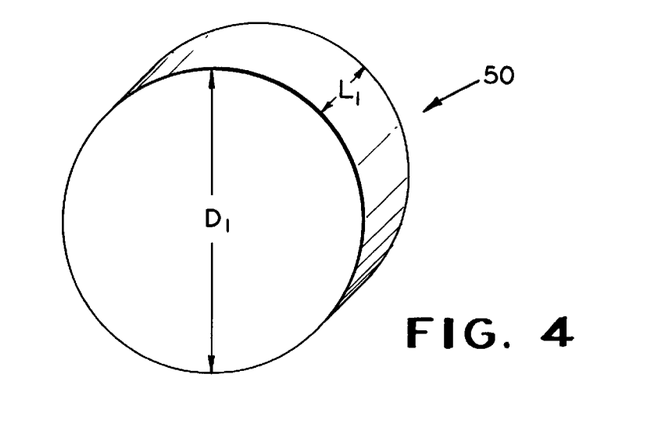
FIG. 4 is a perspective view of one of the noise reduction structures illustrated in FIG. 3.

As shown in FIGS. 3 and 4, the noise reduction structure 50 in accordance with this invention is a generally cylindrical member having a outer diameter D1 and a length L1. Preferably, the outer diameter D1 of the noise reduction structure 50 is slightly larger than the inner diameter D of the driveshaft tube 16. When the outer diameter D1 is slightly larger than inner diameter D, the noise reduction structure 50 may be press fit within the driveshaft tube 16. When the noise reduction structure 50 is press fit into the driveshaft tube 16, it may not be necessary to use an adhesive to retain the structure 50 in place. Alternatively, any suitable adhesive may be used especially if the diameter D1 of the noise reduction structure 50 is formed only as large or even slightly smaller than the inner diameter D of the driveshaft tube 16. As an example, for a driveshaft tube 16 having an inner diameter D of about 5.0 inches to about 5.023 inches (127.0 mm to 127.57 mm) the noise reduction structure may have an outer diameter of about 5.115 inches to about 5.135 inches (129.921 mm to 130.429 mm).

The noise reduction structure 50 is formed having a length L1. In general, the length L1 of the noise reduction structure should be a value which is about 10% or less of the length L of the driveshaft tube 16. As an example, for a driveshaft tube having a length of about 70 inches (1778 mm), the length L1 should be about 7 inches (177.8 mm) or less. More preferably, the length L1 is about 5% or less of the length of the driveshaft tube 16. In a preferred embodiment of the invention, the noise reduction structure has a length L1 of about 1.44 inches to about 1.56 inches (36.6 mm to 39.6 mm). A noise reduction structure having a length in this preferred range could be used for driveshaft tubes 16 having any length, which typically ranges from about 20 inches to about 80 inches (508 mm to 2032 mm).

The location of the noise reduction structure 50 within the driveshaft tube 16 may be important with respect to its effectiveness in reducing noise and vibration from the driveshaft tube 16 during operation of the vehicle. As shown in FIG. 3, the location of the noise reduction structure 50 within the driveshaft tube 16 may be measured by the distance L2. In general, L2 is a portion of the driveshaft tube length L wherein L2 and L are measured from the same starting point. In the illustrated embodiment, L and L2 begin at the end 20 of the driveshaft tube 16 which is adjacent the slip yoke 32. Alternatively, L and L2 may be measured from the center of the circle weld 30 since circle weld 30 is made at the interface of the end 20 of the driveshaft tube 16 and the tube seat 26 on yoke 22. As shown in FIG. 3, the distance L2 may also be defined to include the length L1 of the noise reduction structure 50.

Typically, the appropriate value of L2 is determined empirically through sound pressure (noise) level testing. It has been found that the positioning of the noise reduction structure 50 adjacent either end of the driveshaft tube 16 is the most effective location for reducing noise and vibration. In addition, it has been found that the noise reduction structure 50 should be placed at a location where the amplitude of a standing wave (caused by the reflection of the sound waves back and forth along the driveshaft tube) is at its maximum value. As an example, for a driveshaft tube having a length of about 70 inches (1778 mm), the noise reduction structure may be located at a distance L2 of about 10 inches (254 mm) from the center of the circle weld 30. Therefore, if the noise reduction structure 50 has a length L1 of 1.5 inches (38.1 mm), the distance from the side of the structure 50 facing or oriented toward the slip yoke 32 to the circle weld 30 is about 8.5 inches (215.9 mm). A noise reduction structure being located at this preferred distance L2 could be used for driveshaft tubes 16 having any length, which typically ranges from about 20 inches to about 80 inches (508 mm to 2032 mm).

The type of material used to make the noise reduction structure 50 is important with respect to the structure's effectiveness in reducing noise and vibration. In general, the material used should be compressible so as to allow the noise reduction structure 50 to be in a light press fit or frictional engagement within the driveshaft tube 16. In addition, the material should have elastomeric properties so as to provide constant interference levels with the driveshaft tube 16 for good locational stability. Finally, the material should have good noise absorption/deadening properties. The noise absorption/deadening capability of a material may be characterized using a noise reduction coefficient as measured using ASTM C 423-77 test method.

Applicants have found that a polymeric cushioning foam material is particularly effective in reducing noise and vibration levels in the drive line assembly 15' of an operating vehicle. In addition, the polymeric foams are capable of being press fit within the driveshaft tube 16 and exhibit good locational (stay in place) stability. Preferably, the material is a polyurethane foam. As used herein, a polyurethane is any linear condensation polymer made by the reaction of a diisocyanate and a dihydric alcohol (e.g. toluene diisocyanate with ethylene glycol), the product being characterized by the urethane group (—NHCOO—). Furthermore, the material preferably has a noise reduction coefficient of 0.30 or greater.

Applicants have also found that the density of the material is important with respect to the structure's ability to reduce noise and vibration. More specifically, the material should have a density less than about 10 lb/ft$^3$ (160.18 kg/m$^3$). Preferably, the material has a density of about 2 lb/ft$^3$ to about 10 lb/ft$^3$ (32.04 kg/m$^3$ to 160.18 kg/m$^3$). More preferably, the density is in the range of about 3 lb/ft$^3$ to about 7 lb/ft$^3$ (48.05 kg/m$^3$ to 112.13 kg/m$^3$). Most preferably, the material has a density of about 5 lb/ft$^3$ (80.09 kg/m$^3$).

One type of material which meets all of the above criteria is the polyurethane-based foam OMALON®, grades 9 and 10 (available from Stephenson and Lawyer of Grand Rapids, Mich.). OMALON grade 9 foam has a nominal density of 5 lb/ft$^3$ (80.09 kg/m$^3$) and a noise reduction coefficient (at a ½ inch thickness) of 0.40. OMALON grade 10 has the same noise reduction coefficient but has a nominal density of 5.5 lb/ft$^3$ (88.1 kg/m$^3$).

As a comparison, most of the materials which have been historically used in noise reduction structures have higher densities. For example, rubber including hard, soft commercial, and pure gum, has a density in the range of about 57 lb/ft$^3$ to about 74 lb/ft$^3$ (913.03 kg/m$^3$ to 1185.33 kg/m$^3$). Cork has a density in the range of about 14 lb/ft$^3$ to about 16 lb/ft$^3$ (224.25 kg/m$^3$ to 256.29 kg/m$^3$). Finally, cardboard has a density of about 43 lb/ft$^3$ (688.77 kg/m$^3$). (All data taken from the Handbook of Chemistry and Physics, 62nd Edition, 1981, "Density of Various Solids", page F-1.)

Applicants have also found that materials having relatively low densities are also not as effective in reducing noise and vibration. More specifically, foam materials having a density of about 1 lb/ft$^3$ to 1.5 lb/ft$^3$ (16.02 kg/m$^3$ to 24.03 kg/m$^3$) did not perform as well as foam materials having a density of about 5 lb/ft$^3$ (80.09 kg/m$^3$). The following examples illustrate the invention described above.

EXAMPLE 1

This example illustrates the effectiveness of a noise reduction structure 50 in reducing sound pressure levels (SPL) when it is inserted into an aluminum driveshaft. In this example, the noise reduction structure 50 was made from OMALON foam, #9 grade. The noise reduction structure 50 was 4.9 inches (124.46 mm) in diameter and 1.5 inches (38.1 mm) in length (L1). The noise reduction structure was inserted into a 5.02 inch (127.0 mm) outer diameter aluminum driveshaft approximately 8.5 inches (215.9 mm) from its circle weld 30. Accordingly, L2 measured about 10 inches (254 mm).

Figure 5:
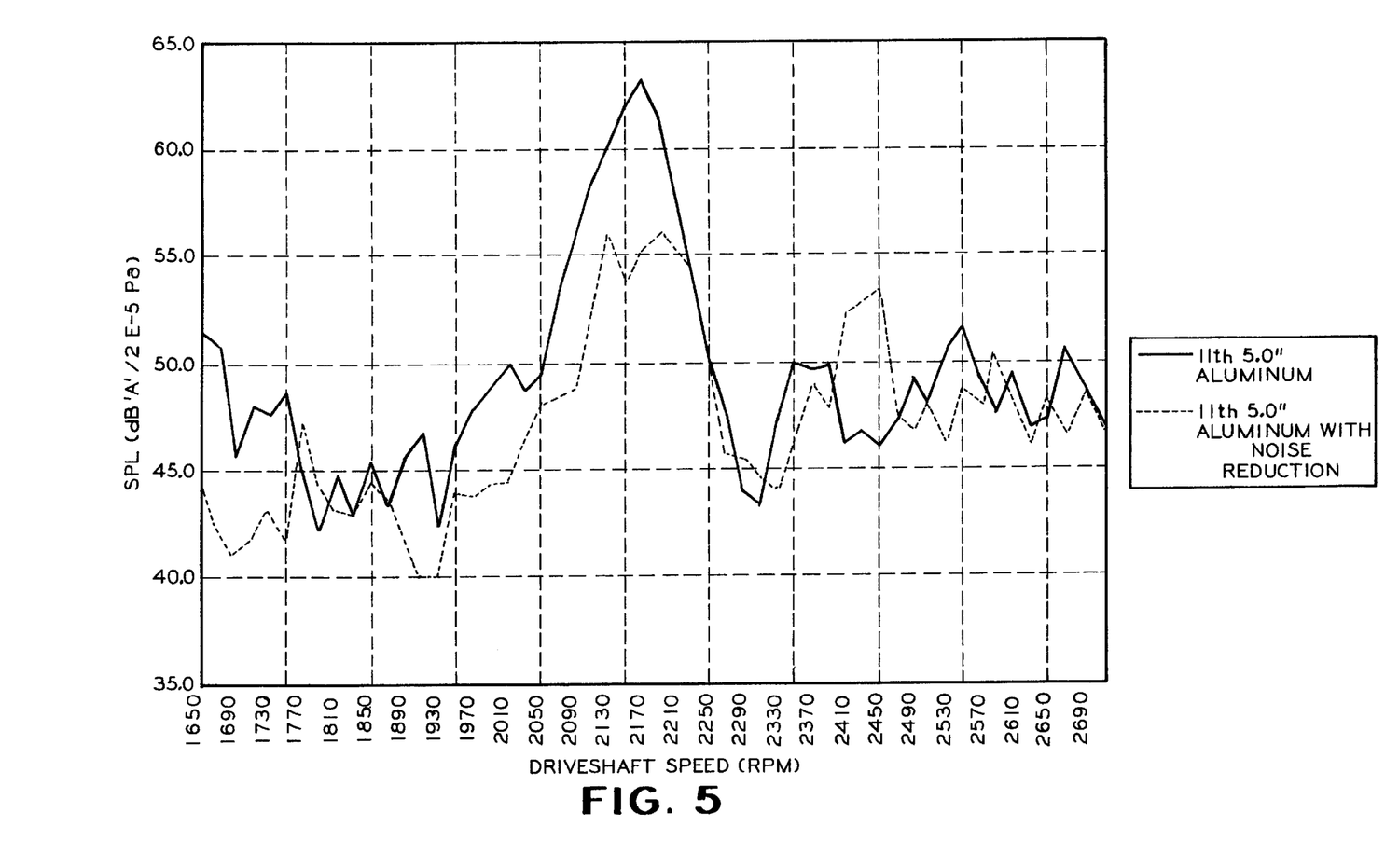
FIG. 5 is a graph of the sound pressure levels (SPL) versus driveshaft speed produced by an aluminum driveshaft without any noise reduction mechanism as compared to the sound pressure levels versus driveshaft speeds produced by an aluminum driveshaft having a noise reduction structure in accordance with this invention.

The results of the measured SPLs at various driveshaft speeds is shown in FIG. 5. As a comparison, the SPLs at various driveshaft speeds for the same aluminum driveshaft without a noise reduction structure are also shown in FIG. 5. The data shown in FIG. 5 measures the sound pressure levels for the 11th order axle pinion frequency. In order to effectively test any driveshaft for noise levels, the driveshaft should be connected to the axle it will be driving. Therefore, the particular axle configuration may also affect which frequency and harmonics are most important to test. In this particular test, and the remaining tests presented in Examples 2 and 3 below, an axle having eleven teeth on its pinion gear was used. Since the eleven teeth on the pinion gear will mesh with a ring gear eleven times per single rotation of the driveshaft, the frequency of the noise being generated is a function of the frequency of the driveshaft times eleven. Accordingly, the 11th order SPL data was measured because it represents the harmonic of the driveshaft frequency which contributes the most to the noise levels of the driveshaft.

FIG. 5 shows that the aluminum driveshaft with the noise reduction structure produced lower 11th order SPLs than the aluminum driveshaft without the noise reduction structure. In particular, at the normal driveshaft speeds, i.e. about 1900 to about 2300 rpm, the driveshaft with the noise reduction structure 50 produced significantly lower 11th order SPLs than the driveshaft without the noise reduction structure.

EXAMPLE 2

This example compares the effectiveness of a noise reduction structure 50 in reducing sound pressure levels (SPL) with an alternative mechanism in reducing noise and vibration in a driveshaft. In this example, an aluminum driveshaft which has been coated with graphite is compared with an aluminum driveshaft having the inventive noise reduction structure 50 inserted therein. The use of a graphite coating on an aluminum driveshaft is another mechanism which may be effective in reducing the noise and vibration produced by that driveshaft. However, an aluminum driveshaft a graphite coating is more difficult to manufacture and more expensive than a driveshaft which includes a foam noise reduction structure. The noise reduction structure 50 used in this Example is the same as the structure described above in Example 1 (i.e. OMALON foam, #9 grade; 4.9 inches (124.46 mm) in diameter; 1.5 inches (38.1 mm) in length (L1); inserted into a 5.02 inch (127 mm) outer diameter aluminum driveshaft approximately 8.5 inches (215.9 mm) from its circle weld 30 such that L2 is about 10 inches (254 mm)).

Figure 6:
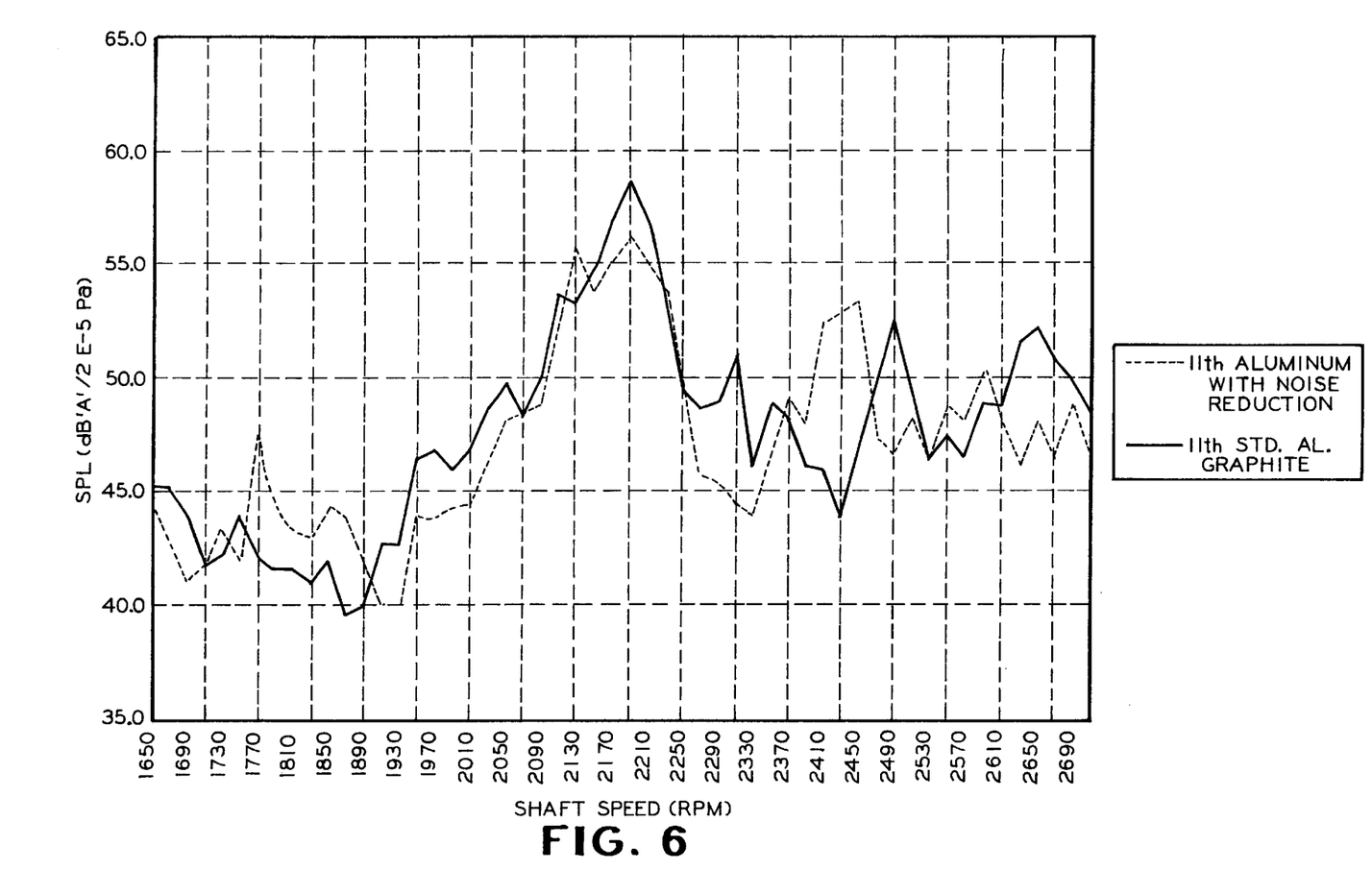
FIG. 6 is a graph of the sound pressure levels (SPL) versus driveshaft speed produced by a graphite coated aluminum driveshaft as compared to the sound pressure levels versus driveshaft speeds produced by an aluminum driveshaft having a noise reduction structure in accordance with this invention.

The results of the measured SPLs for both the graphite coated aluminum driveshaft and the driveshaft with the noise reduction structure at various driveshaft speeds is shown in FIG. 6. As seen therein, the driveshaft with the noise reduction structure was as effective in reducing the 11th order SPLs as the graphite coated driveshaft. In particular, the driveshaft with the noise reduction structure was better at reducing the 11th order SPLs at the normal driving speeds between about 1900 to about 2300 rpm.

EXAMPLE 3

This example compares the effectiveness of a noise reduction structure 50 made from a polymeric foam as compared to a noise reduction structure made from a non-polymeric foam. In this example, both noise reduction structures have a density in the preferred range of having a density in the preferred range of about 2 lb/ft³ to 10 lb/ft³ (32.04 kg/m³ to 160.18 kg/m³). The polymeric noise reduction structure 50 as used in Examples 1 and 2 is also used in this third example (i.e. OMALON foam, #9 grade; 4.9 inches (124.46 mm) in diameter; 1.5 inches (38.1 mm) in length (L1); inserted into a 5.02 inch (127 mm) outer diameter aluminum driveshaft approximately 8.5 inches (215.9 mm) from its circle weld 30 such that L2 was about 10 inches (254 mm)). The non-polymeric noise reduction structure 50 is made from 3–600 charcoal custom felt (available from Stephenson and Lawyer, Grand Rapids, Mich.). The charcoal felt has a density of about 5.75 lb/ft3 (92.12 kg/m3). The non-polymeric noise reduction structure 50 also measured 4.9 inches (124.46 mm) in diameter and 1.5 inches (38.1 mm) in length (L1). Similarly to the noise reduction structure 50 made from the OMALON foam, the charcoal felt structure was inserted into the driveshaft approximately 8.5 inches (215.9 mm) from its circle weld 30 (such that L2 was about 10 inches (254 mm)).

Figure 7:
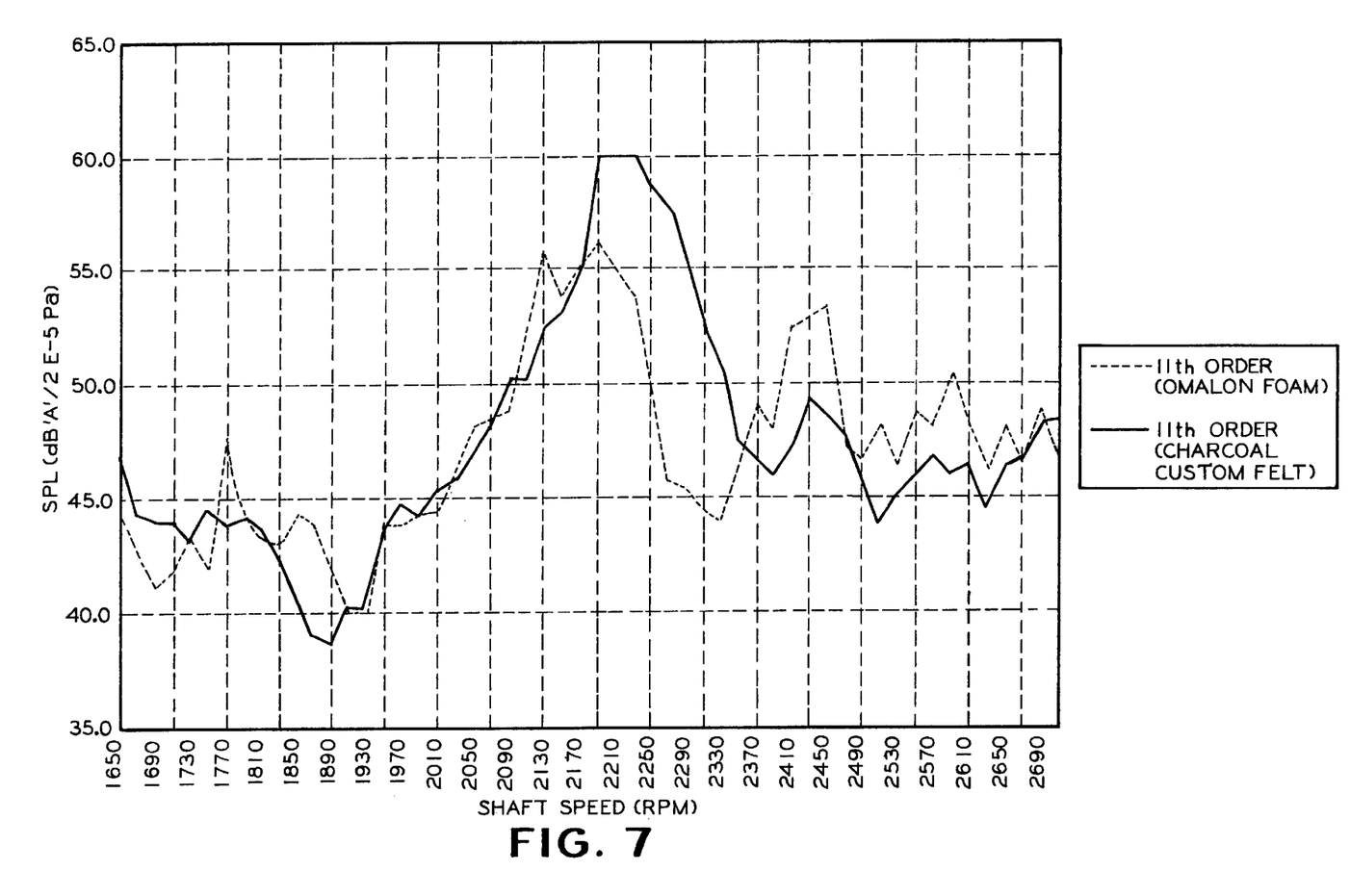
FIG. 7 is a graph of the sound pressure levels (SPL) versus driveshaft speed produced by an aluminum driveshaft having a noise reduction structure made from a very low density foam material as compared to the sound pressure levels versus driveshaft speeds produced by an aluminum driveshaft having a noise reduction structure made in accordance with this invention.

The results of the measured SPLs for both the OMALON foam noise reduction structure and the charcoal felt noise reduction structure at various driveshaft speeds is shown in FIG. 7. As seen therein, the OMALON foam noise reduction structure was more effective in reducing the 11th order SPLs than the charcoal felt noise reduction structure. In particular, the OMALON foam noise reduction structure was better at reducing the 11th order SPLs at the normal driving speeds between about 2150 to about 2350 rpm. Comparing FIG. 7 to FIGS. 5 and 6, it can be seen that the charcoal custom felt structure produced lower 11th order SPL levels than the SPL levels of the aluminum driveshaft (FIG. 5), however, higher 11th order SPL levels resulted than the SPL levels of the aluminum driveshaft with graphite coating (FIG. 6).

If desired, two or more of noise reduction structures 50 may be disposed within the driveshaft tube 16. As shown in dotted lines in FIG. 3, a second noise reduction structure 50 can be disposed within the driveshaft tube 50 in the same manner as described above. It may be desirable to provide such additional noise reduction structures 50 at spaced apart locations within the driveshaft tube 16 to address vibration and noise generated by secondary harmonics of the resonant frequency.

As an alternative to the embodiment described above, it has been found to be desirable to form the noise reduction structure from a polyether material having density of at least 1.4 lb/ft³, and most desirably are formed having a density of 1.5 lb/ft³. In a driveshaft tube 16 having a length of from about 58 inches (1473 mm) to about 70 inches (1778 mm), it has been found desirable to press fit a single elongated noise reduction structure 50 therein that is formed from the polyether material. The noise reduction structure 50 is preferably about 40 inches (1016 mm) in length and is centered within the axial length of such a driveshaft tube 16. Alternatively, a plurality of separate noise reduction structures 50 may be provided within the driveshaft tube 16. It has been found desirable to press fit four of such noise reduction structures 50 formed from the polyether material within the driveshaft tube 16. Each of the noise reduction structures is preferably about 8 inches (203 mm) in length and are spaced equidistantly apart from one another symmetrically within the driveshaft tube 16.

As a further alternative, the noise reducing structure 50 may be formed from a closed cell plastic foam material. Such a closed cell plastic foam material is essentially waterproof, thus preventing degradation from exposure to the elements. The closed cell nature of the material provides a plurality of air-filled cells that function to absorb noise and vibrations, while maintaining a relatively low weight.

Figure 8:
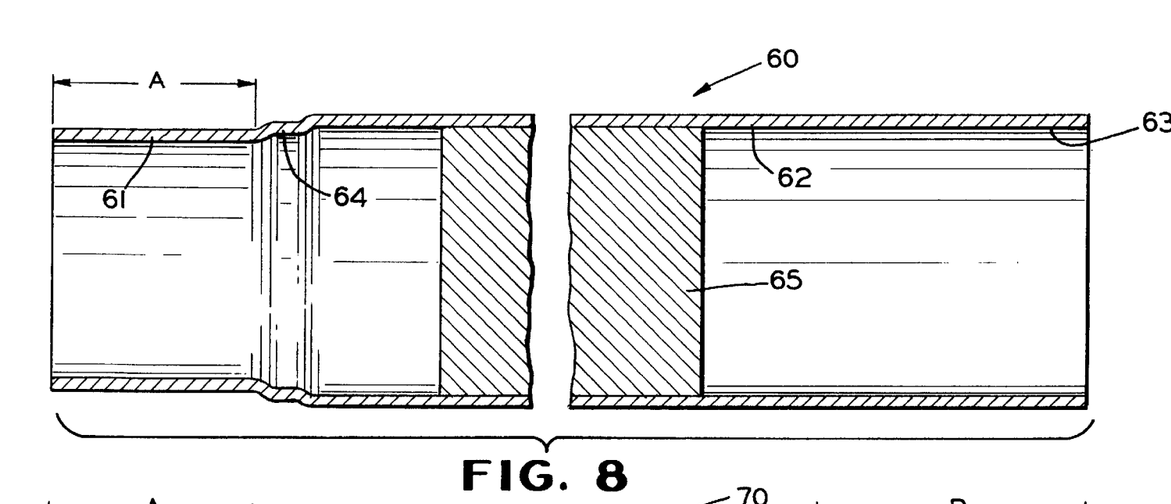
FIG. 8 is a schematic side elevational view of a second embodiment of a driveshaft tube having a noise reducing structure provided therein.

As mentioned above, the driveshaft 16 can be formed having a larger diameter center portion, an end portion having a reduced diameter, and a diameter reducing portion positioned between the center and end portions. FIG. 8 schematically illustrates a second embodiment of a driveshaft tube 60 having a noise reducing structure provided therein in accordance with this invention. The driveshaft tube 60 has a first end 61, a central portion 62, and a second end 63. The central portion of the driveshaft tube 60 defines a diameter that is somewhat larger than the diameter of the first end portion 61. Thus, a diameter reducing portion 64 is defined between the first end portion 61 and the central portion 62 of the driveshaft tube 60. The second end 63 of the driveshaft tube 60 is formed having the same diameter as the central portion 62. The driveshaft tube 60 is preferably formed from an aluminum alloy material and is formed having an overall axial length of from about 58 inches (1473 mm) to about 70 inches (1778 mm). The reduced diameter first end portion 61 of the driveshaft tube 60 has an axial length that is designated by "A" in FIG. 8. Preferably, the axial length "A" is about 4 inches (100 mm).

A noise reducing structure 65 is press fit within the central portion 62 of the driveshaft tube 60. The noise reducing structure 65 is preferably from a polyether material having density of at least 1.4 lb/ft$^3$, and most desirably are formed having a density of 1.5 lb/ft$^3$. In the above-discussed driveshaft tube 60 having a length of from about 58 inches (1473 mm) to about 70 inches (1778 mm), it has been found desirable to press fit a single elongated noise reduction structure 65 therein that is formed from the polyether material. The noise reduction structure 65 is preferably about 40 inches (1016 mm) in length and is centered within the axial length of the driveshaft tube 65. Alternatively, a plurality of separate noise reduction structures (not shown) may be provided within the driveshaft tube 60. It has been found desirable to press fit four of such noise reduction structures formed from the polyether material within the driveshaft tube 60. Each of the noise reduction structures is preferably about 8 inches (203 mm) in length and are spaced equidistantly apart from one another symmetrically within the driveshaft tube 60.

Figure 9:
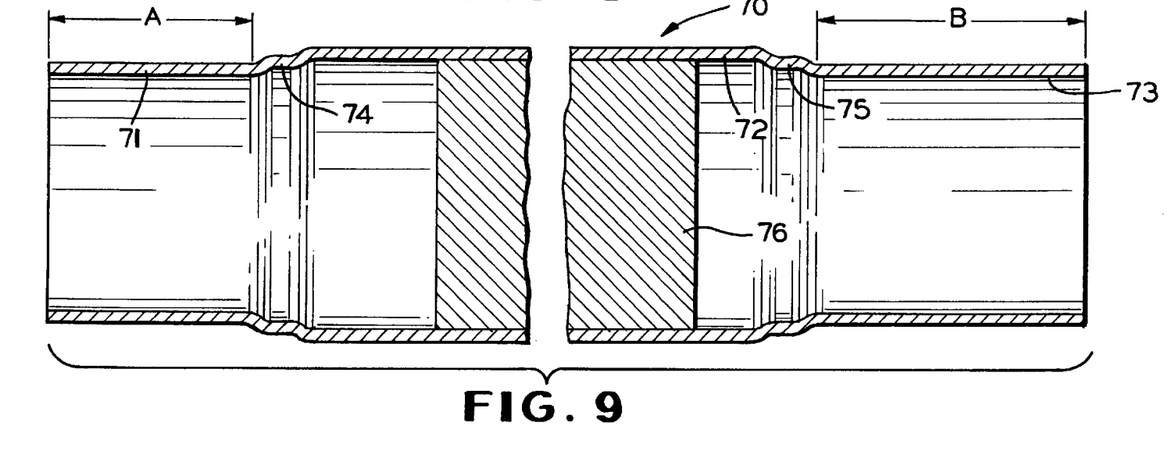
FIG. 9 is a schematic side elevational view of a third embodiment of a driveshaft tube having a noise reducing structure provided therein.

FIG. 9 schematically illustrates a third embodiment of a driveshaft tube 70 having a noise reducing structure provided therein in accordance with this invention. The driveshaft tube 70 has a first end 71, a central portion 72, and a second end 73. The central portion of the driveshaft tube 70 defines a diameter that is somewhat larger than the diameter of the first end portion 71. Thus, a first diameter reducing portion 74 is defined between the first end portion 71 and the central portion 72 of the driveshaft tube 70. The central portion of the driveshaft tube 70 also defines a diameter that is somewhat larger than the diameter of the second end portion 73. Thus, a second diameter reducing portion 75 is defined between the second end portion 73 and the central portion 72 of the driveshaft tube 70. The driveshaft tube 70 is preferably formed from an aluminum alloy material and is formed having an overall axial length of from about 58 inches (1473 mm) to about 70 inches (1778 mm). The reduced diameter first end portion 71 of the driveshaft tube 70 has an axial length that is designated by "A" in FIG. 9. Preferably, the axial length "A" is about 4 inches (100 mm). The reduced diameter second end portion 73 of the driveshaft tube 70 has an axial length that is designated by "B"0 in FIG. 9. Preferably, the axial length "A" is about 8 inches (200 mm) or 12 inches (300 mm).

A noise reducing structure 76 is press fit within the central portion 72 of the driveshaft tube 70. The noise reducing structure 75 is preferably from a polyether material having density of at least 1.4 lb/ft$^3$, and most desirably are formed having a density of 1.5 lb/ft$^3$. In the above-discussed driveshaft tube 70 having a length of from about 58 inches (1473 mm) to about 70 inches (1778 mm), it has been found desirable to press fit a single elongated noise reduction structure 76 therein that is formed from the polyether material. The noise reduction structure 76 is preferably about 40 inches (1016 mm) in length and is centered within the axial length of the driveshaft tube 75. Alternatively, a plurality of separate noise reduction structures (not shown) may be provided within the driveshaft tube 70. It has been found desirable to press fit four of such noise reduction structures formed from the polyether material within the driveshaft tube 70. Each of the noise reduction structures is preferably about 8 inches (203 mm) in length and are spaced equidistantly apart from one another symmetrically within the driveshaft tube 70.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft assembly for a vehicle drive train comprising:
   a hollow cylindrical driveshaft tube including an inner cylindrical surface and having a predetermined length; and
   a noise reduction structure retained within said driveshaft tube, said noise reduction structure being formed from a polyether material having density of at least 1.4 lb/ft$^3$.

2. The driveshaft assembly defined in claim 1 wherein said polyether material having density of 1.5 lb/ft$^3$.

3. The driveshaft assembly defined in claim 1 wherein said driveshaft tube has a length of from about 58 inches (1473 mm) to about 70 inches (1778 mm), and wherein said noise reduction structure is a single member having a length of about 40 inches (1016 mm).

4. The driveshaft assembly defined in claim 3 wherein said noise reduction structure is centered within said driveshaft tube.

5. The driveshaft assembly defined in claim 1 wherein said driveshaft tube has a length of from about 58 inches (1473 mm) to about 70 inches (1778 mm), and wherein said noise reduction structure is a plurality of members.

6. The driveshaft assembly defined in claim 5 wherein said plurality of members comprises four members.

7. The driveshaft assembly defined in claim 5 wherein said plurality of members of said noise reduction structure are equidistantly spaced within said driveshaft tube.

8. The driveshaft assembly defined in claim 5 wherein each of said plurality of members of said noise reduction structure is about 8 inches (203 mm) in length.

9. The driveshaft assembly defined in claim 1 wherein said driveshaft tube is formed having a reduced diameter end portion.

10. The driveshaft assembly defined in claim 9 wherein said driveshaft tube has a length of from about 58 inches (1473 mm) to about 70 inches (1778 mm), and wherein said reduced diameter end portion extends about 4 inches (100 mm).

11. The driveshaft assembly defined in claim 10 wherein said noise reduction structure is a single member having a length of about 40 inches (1016 mm).

12. The driveshaft assembly defined in claim 1 wherein said driveshaft tube is formed having first and second reduced diameter end portions.

13. The driveshaft assembly defined in claim 12 wherein said driveshaft tube has a length of from about 58 inches (1473 mm) to about 70 inches (1778 mm), and wherein said first reduced diameter end portion extends about 4 inches (100 mm).

14. The driveshaft assembly defined in claim 13 wherein second reduced diameter end portion extends about 8 inches (200 mm).

15. The driveshaft assembly defined in claim 13 wherein second reduced diameter end portion extends about 12 inches (300 mm).

16. The driveshaft assembly defined in claim 13 wherein said noise reduction structure is a single member having a length of about 40 inches (1016 mm).

17. A driveshaft assembly for a vehicle drive train comprising:
- a hollow cylindrical driveshaft tube including an inner cylindrical surface and having predetermined length, said hollow cylindrical driveshaft tube including a first end portion having a first end diameter, a second end portion having a second end diameter, a central portion located between said first and second ends and having a central portion diameter larger than the first end diameter and approximately equal to the second end diameter, and a reduced diameter portion located between the central portion and the first end portion, the reduced diameter portion having a diameter larger than the first end diameter and smaller than the central portion diameter; and
- a noise reduction structure retained within the central portion of said driveshaft tube, said noise reduction structure being formed from a polyether material having density of at least 1.4 lb/ft$^3$.

18. A driveshaft assembly for a vehicle drive train comprising:
- a hollow cylindrical driveshaft tube including a first end portion having a first end diameter, a second end portion having a second end diameter, a central portion located between said first and second end portions and having a central portion diameter larger than the first and second end diameters, a first reduced diameter portion located between the central portion and the first end portion and having a first reduced diameter larger than the first end diameter and smaller than the central portion diameter, and a second reduced diameter portion located between the central portion and the second end portion and having a second reduced diameter larger than the second end diameter and smaller than the central portion diameter; and
- a noise reduction structure retained within the central portion of said driveshaft tube, said noise reduction structure being formed from a polyether material having density of at least 1.4 lb/ft$^3$.

* * * * *

UNITED STATES PATENT AND TRADEMARK OFFICE
CERTIFICATE OF CORRECTION

PATENT NO.   : 6,234,911 B1
DATED        : May 22, 2001
INVENTOR(S)  : Douglas E. Breese et al.

It is certified that error appears in the above-identified patent and that said Letters Patent is hereby corrected as shown below:

<u>Column 10, claim 7,</u>
Line 1, after "claim", change "5" to -- 6 --.

Signed and Sealed this

Nineteenth Day of March, 2002

Attest:

JAMES E. ROGAN
*Director of the United States Patent and Trademark Office*

*Attesting Officer*